(12) United States Patent
Cheng et al.

(10) Patent No.: US 9,425,485 B1
(45) Date of Patent: Aug. 23, 2016

(54) ELECTROLYTE FORMULATIONS FOR GAS SUPPRESSION AND METHODS OF USE

(71) Applicant: Wildcat Discovery Technologies, Inc., San Diego, CA (US)

(72) Inventors: Gang Cheng, San Diego, CA (US); Steven Kaye, San Diego, CA (US)

(73) Assignee: Wildcat Discovery Technologies, Inc., San Diego, CA (US)

( * ) Notice: Subject to any disclaimer, the term of this patent is extended or adjusted under 35 U.S.C. 154(b) by 0 days.

(21) Appl. No.: 14/671,192

(22) Filed: Mar. 27, 2015

(51) Int. Cl.
*H01M 10/0567* (2010.01)
*H01M 10/42* (2006.01)
*H01M 10/04* (2006.01)
*H01M 10/052* (2010.01)

(52) U.S. Cl.
CPC .......... *H01M 10/0567* (2013.01); *H01M 10/04* (2013.01); *H01M 10/4235* (2013.01); *H01M 10/052* (2013.01); *H01M 2300/0025* (2013.01)

(58) Field of Classification Search
None
See application file for complete search history.

(56) References Cited

U.S. PATENT DOCUMENTS

| 6,268,088 | B1* | 7/2001 | Oh et al. ................... 429/303 |
| 8,308,971 | B1 | 11/2012 | Bhat et al. |
| 9,287,586 | B1* | 3/2016 | Cheng ............... H01M 10/0567 |
| 2006/0078801 | A1 | 4/2006 | Yamaguchi et al. |
| 2006/0199080 | A1 | 9/2006 | Amine et al. |
| 2008/0248396 | A1 | 10/2008 | Jung et al. |
| 2009/0142663 | A1 | 6/2009 | Takeuchi et al. |
| 2011/0151337 | A1 | 6/2011 | Kim et al. |
| 2012/0009485 | A1 | 1/2012 | Xu et al. |
| 2012/0082872 | A1 | 4/2012 | Schmidt et al. |
| 2012/0135298 | A1 | 5/2012 | Yamada et al. |
| 2012/0141878 | A1 | 6/2012 | Ohashi et al. |
| 2012/0141883 | A1 | 6/2012 | Smart et al. |
| 2012/0177980 | A1 | 7/2012 | Iwayasu et al. |
| 2013/0029217 | A1* | 1/2013 | Bhat et al. ................... 429/188 |
| 2013/0122379 | A1 | 5/2013 | Hwang et al. |
| 2014/0302387 | A1* | 10/2014 | Nishizawa et al. .......... 429/200 |
| 2014/0302405 | A1 | 10/2014 | Sasaki et al. |

FOREIGN PATENT DOCUMENTS

| CN | 1385918 A | 12/2002 |
| KR | 1020040000129 | 1/2004 |
| KR | 100463188 | 12/2004 |

OTHER PUBLICATIONS

International Search Report and Written Opinion issued Aug. 12, 2014 in PCT/US2014/028304.
Lee et al., "Effect of an organic additive on the cycling performance and thermal stability of lithium-ion cells assembled with carbon anode and LiNi1/3Co1/3Mn1/3O2 cathode," Journal of Power Sources 196 (2011) 6997-7001.

* cited by examiner

*Primary Examiner* — Alix Eggerding
(74) *Attorney, Agent, or Firm* — Corridor Law Group, P.C.

(57) ABSTRACT

Combinations of additives for use in electrolyte formulations that provide a number of desirable characteristics when implemented within batteries, such as reduction, suppression, and/or inhibition of undesirable gas generation over several cycles of charging and discharging, in some cases during operation at high temperature and in some cases during high temperature storage.

21 Claims, 4 Drawing Sheets

ELECTROLYTE FORMULATIONS FOR GAS SUPPRESSION AND METHODS OF USE

BACKGROUND OF THE INVENTION

The present invention is in the field of battery technology and, more particularly, electrolyte formulations that address challenges associated with gas generation in lithium ion batteries.

Gas evolution during storage and use is a major failure mechanism of lithium ion batteries. The mechanism of gas generation is still not well understood. It has been shown that the parasitic reactions between electrolyte and electrodes could result in gaseous products. Gas formed in the cells could cause impedance growth, electrode delamination, swelling, and active material isolation. One or more of these outcomes could lead to faster capacity fade, cell failure, and safety concerns.

Lithium ion batteries operating at higher voltage are in demand to meet the comparatively higher energy density requirement for a variety of applications, including automotive applications. However, challenges in maintaining battery life over high multiples of charge/discharge cycles and safety concerns prevent higher voltage lithium ion batteries from being more widely used. For example, gas generation can in turn lead to swelling and/or deformation of the battery. In pouch type batteries (batteries with soft shells), this deformation can lead to rupture. Thus, gas generation can lead to capacity fade, power fade, and safety risks in lithium ion batteries.

Gas evolution tends to be more significant at higher operating voltages for one or more of the following reasons: (i) oxidative decomposition of solvent components, such as carbonates, leading to formation of $CO_2$ or gaseous organic compounds; (ii) unstable cathodes at high delithiation states leading to oxygen evolution, which could cause further electrolyte decomposition; (iii) formation of acidic product from salt decomposition resulting in decomposition and reformation of the solid-electrolyte interface (SEI), which can cause rapid capacity fade and gas evolution.

Gas generation can also occur during high temperature storage of lithium ion batteries, which limits the applications in which certain lithium ion batteries can be used.

Prior efforts to reduce gas generation in lithium ion cells have focused mainly on using electrolyte additives and various approaches to electrode coating. To date, these efforts have not been successful in addressing gas evolution.

These and other challenges can be addressed by certain embodiments of the invention described herein.

BRIEF SUMMARY OF THE INVENTION

Embodiments of the present invention are electrolyte formulations including additives and/or combination of additives disclosed herein. The electrolyte formulations are used to form a battery including an anode and a cathode. The electrolyte formulation includes a polymer additive and the polymer additive includes one or more of poly[(N-vinyl pyrrolidone)-co-(vinyl acetate)] and poly[1,6-bis(p-carboxyphenoxy)hexane]. The battery can include an inorganic silicon containing additive, which can be calcium silicate. The battery can include a solid-electrolyte interface promoting additive, which can be gamma butyrolactone or succinonitrile, for example. The battery can include a lithium salt additive, such as lithium tetrafluoroborate (LiBF4), lithium difluoro(oxalato)borate (LiFOB), or lithium bis(oxalato)borate (LiBOB).

Embodiments of the present invention include the methods of making such electrolyte formulations using the additives and/or combination of additives disclosed herein, the methods of forming batteries including such electrolyte formulations having the additives and/or combination of additives disclosed herein, and using batteries including such electrolyte formulations having the additives and/or combination of additives disclosed herein.

DETAILED DESCRIPTION OF THE INVENTION

Figure 1:
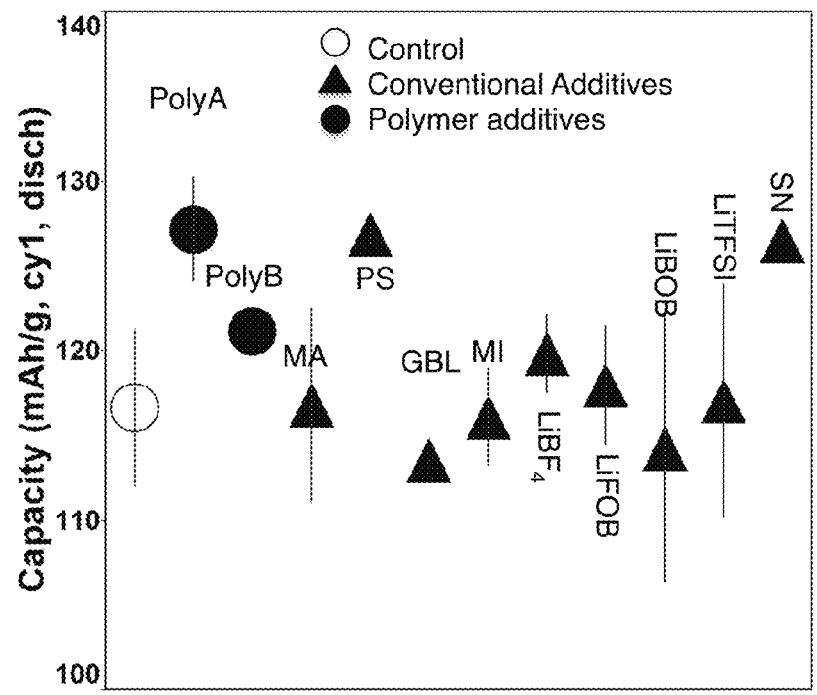
FIG. 1 illustrates the electrochemical performance of various electrolyte formulations, including some formulations made according to certain embodiments of the invention.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

Ranges presented herein are inclusive of their endpoints. Thus, for example, the range 1 to 3 includes the values 1 and 3 as well as the intermediate values.

The electrolyte solutions having certain additives and/or combinations of additives described herein can be used for a variety of batteries containing a high voltage cathode or a low voltage cathode, and in particular in batteries operated at high temperatures and in batteries stored at high temperatures. For example, the electrolyte solutions having certain additives and/or combinations of additives described herein can be substituted in place of conventional electrolytes for lithium ion batteries for operations at or below 4.2 V (low voltage) or at or above 4.2 V (high voltage).

A lithium ion battery formed in accordance with embodiments of the invention includes an anode, a cathode, and a separator that is disposed between the anode and the cathode. The battery also includes an electrolyte formulation, which is disposed between the anode and the cathode and provides improved performance during high voltage battery cycling and/or low voltage battery cycling in high temperature environments or during high temperature storage.

The operation of the battery is based upon reversible intercalation and de-intercalation of lithium ions into and from the host materials of the anode and the cathode. Other implementations of the battery are contemplated, such as those based on conversion chemistry. The voltage of the battery is based on redox potentials of the anode and the cathode, where lithium ions are accommodated or released at a lower potential in the anode and a higher potential in the cathode. Certain embodiments of the electrolyte formulation disclosed herein are suitable for use with both conventional cathode materials and with high voltage cathode materials.

To allow both a higher energy density and a higher voltage platform to deliver that energy, the cathode can include an active cathode material for high voltage operations at or above 4.2 V. Suitable high voltage cathode materials include those capable of stable operation up to about 6.0 V, up about 5.5 V, up to about 5.0 V, and up to about 4.5 V relative to a lithium metal anode (Li/Li$^+$ anode) or other counter electrode.

Examples of suitable high voltage cathode materials include phosphates, fluorophosphates, fluorosulfates, fluorosilicates, spinels, lithium-rich layered oxides, and composite layered oxides. Further examples of suitable cathode materials include: spinel structure lithium metal oxides, layered structure lithium metal oxides, lithium-rich layered structured lithium metal oxides, lithium metal silicates, lithium metal phosphates, metal fluorides, metal oxides, sulfur, and metal sulfides.

For example, a class of suitable high voltage spinels can be represented as: $Li_a(M1_bM2_cM3_dM4_e)_fO_4$, where M1, M2, M3, and M4 can be the same or different, M1 is Mn or Fe, M2 is Mn, Ni, Fe, Co, or Cu, M3 is a transition metal, such as Ti, V, Cr, Mn, Fe, Co, Ni, Zr, Nb, or Mo, and M4 is a transition metal or a main group element, optionally excluding elements of Group VIA and Group VIIA, $1.2 \geq a \geq 0.9$ (or $1.2 > a > 0.9$), $1.7 \geq b \geq 1.2$ (or $1.7 > b > 1.2$), $0.8 \geq c \geq 0.3$ (or $0.8 > c > 0.3$), $0.1 \geq d \geq 0$ (or $0.1 > d > 0$), $0.1 \geq e \geq 0$ (or $0.1 > e > 0$), and $2.2 \geq f \geq 1.5$ (or $2.2 > f > 1.5$). LMNO-type cathode materials, such as $Li_{1.05}Mn_{1.5}Ni_{0.5}O_4$ and LMO-type materials, such as $LiMn_2O_4$ are included in this class.

For example, a class of suitable high voltage, lithium-rich layered oxides can be represented as: $Li(Li_aM1_bM2_cM3_dM4_e)_fO_2$, where M1, M2, M3, and M4 can be the same or different, M1 is a transition metal, such as Mn, Fe, V, Co, or Ni, M2 is a transition metal, such as Mn, Fe, V, Co, or Ni, M3 is a transition metal, such as Mn, Fe, V, Co, or Ni, M4 is a transition metal or a main group element, optionally excluding elements of Group VIA and Group VIIA, $0.4 \geq a \geq 0.05$ (or $0.4 > a > 0.05$), $0.7 \geq b \geq 0.1$ (or $0.7 > b > 0.1$), $0.7 \geq c \geq 0.1$ (or $0.7 > c > 0.1$), $0.7 \geq d \geq 0.1$ (or $0.7 > d > 0.1$), $0.2 \geq e \geq 0$ (or $0.2 > e > 0$), and $1.2 \geq f \geq 0.9$ (or $1.2 > f > 0.9$). The term "OLO" refers to an over-lithiated oxide material and such cathode materials are included in this class.

For example, a class of suitable high voltage, composite layered oxides can be represented as: $(Li_2M1_aM2_bO_3)_c(LiM3_dM4_eM5_fO_2)_g$, where M1, M2, M3, M4, and M5 can be the same or different, M1 is a transition metal, such as Mn, Fe, V, Co, or Ni, M2 is a transition metal, such as Mn, Fe, V, Co, or Ni, M3 is a transition metal, such as Mn, Fe, V, Co, or Ni, M4 is a transition metal, such as Mn, Fe, V, Co, or Ni, M5 is a transition metal or a main group element, optionally excluding elements of Group VIA and Group VIIA, $1.1 \geq a \geq 0$ (or $1.1 > a > 0$), $0.5 \geq b \geq 0$ (or $0.5 > b > 0$), $0.7 \geq c \geq 0$ (or $0.7 > c > 0$), $1 \geq d \geq 0$ (or $1 > d > 0$), $1 \geq e \geq 0$ (or $1 > e > 0$), $1 \geq f \geq 0$ (or $1 > f > 0$), and $1 \geq g \geq 0.5$ (or $1 > g > 0.5$).

Examples of suitable anode materials include conventional anode materials used in lithium ion batteries, such as lithium, graphite ($Li_xC_6$), and other carbon, silicon, or oxide-based anode materials.

Examples of suitable solvents include nonaqueous electrolyte solvents for use in lithium ion batteries, including carbonates, such as ethylene carbonate, dimethyl carbonate, ethyl methyl carbonate, propylene carbonate, methyl propyl carbonate, and diethyl carbonate; sulfones; silanes; nitriles; esters; ethers; and combinations thereof.

Examples of suitable salts include lithium containing salts for use in lithium ion batteries, such as lithium hexafluorophosphate ($LiPF_6$), lithium perchlorate ($LiClO_4$), lithium tetrafluoroborate ($LiBF_4$), lithium trifluoromethane sulfonate ($LiCF_3SO_3$), lithium bis(trifluoromethane sulfonyl) imide ($LiN(CF_3SO_2)_2$), lithium bis(perfluoroethyl sulfonyl) imide ($LiN(CF_3CF_2SO_2)_2$), lithium bis(oxalato)borate ($LiB(C_2O_4)_2$), lithium difluoro oxalato borate ($LiF_2BC_2O_4$), and combinations thereof.

Other suitable solvents and salts can be used to yield electrolyte formulations having low electronic conductivity, high lithium ion solubility, low viscosity, and other desirable characteristics. The additives and/or combinations of additives disclosed herein can be used as additives in the various electrolyte formulations possible via the combination of salts and solvents disclosed herein.

The electrolyte formulations disclosed herein can be prepared using a variety of techniques, such as by mixing the base electrolyte and the combinations of additives, dispersing the additives and/or combinations of additives within the base electrolyte, dissolving the additives and/or combinations of additives within the base electrolyte, or otherwise placing these components in contact with one another. The additives and/or combinations of additives can be provided in a liquid form, a powdered form (or another solid form), or a combination thereof. The additives and/or combinations of additives can be incorporated in the electrolyte solutions prior to, during, or subsequent to battery assembly.

When an electrolyte includes a base conventional electrolyte, during initial battery cycling components within the base electrolyte can assist in the in-situ formation of a protective film (in the form of a solid-electrolyte interface (SEI)) on or next to the anode. The anode SEI can decrease or inhibit reductive decomposition of the conventional electrolyte. Preferably, and without being bound by theory not recited in the claims, for operation at high temperatures or for storage at high temperatures, the electrolyte formulations having the combinations of additives disclosed herein can assist in the in-situ formation of a protective film (in the form of a SEI) on or next to a cathode. The cathode SEI can inhibit oxidative decomposition of the electrolyte. Further, the electrolyte formulations having the additives and/or combinations of additives disclosed herein can assist in the formation of more stable anode SEI. Together, the anode SEI and the cathode SEI formed by the electrode formulations disclosed herein can reduce gas generation in lithium ion batteries.

Electrolyte formulations including the additives and/or combinations of electrolyte additives disclosed herein can form comparatively robust SEI films on cathode surfaces. Certain of the electrolyte formulations can inhibit or prevent the decomposition of lithium salts (including, but not limited to, $LiPF_6$) at higher voltage and high temperature. The robust SEI films and stable lithium salts can mitigate gas generation in batteries containing these electrolyte formulations.

Certain electrolyte formulations disclosed herein include a polymer compound as one of the additives in the additive combination. Certain polymer additives have been shown to improve electrolyte stability in certain lithium ion cells (see U.S. Patent Publication No. 2014/0272553, filed Mar. 19, 2014 titled "Electrolyte Solutions for High Energy Cathode Materials and Methods for Use," the entire contents of which is incorporated by reference herein). However, polymer additives alone were found to not substantially suppress gas generation in testing conducted as described below. Examples of suitable polymer additives include poly[(N-vinyl pyrrolidone)-co-(vinyl acetate)] and poly[1,6-bis(p-carboxyphenoxy)hexane]. Poly[(N-vinyl pyrrolidone)-co-(vinyl acetate)] is a copolymer of the following structures:

(a)

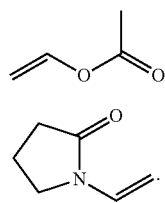

(b)

Poly[1,6-bis(p-carboxyphenoxy)hexane] can be represented as:

(c)

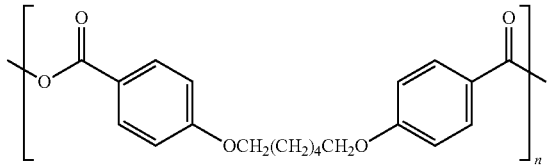

Other additives are known to have properties that can promote the formation of comparatively stable SEI on an anode or cathode or both. Film forming additives, such as monomeric or otherwise reactive small molecules that cab polymerize or cross-react in situ, are examples of SEI promoting additives. Film forming additives include, but are not limited to, comparatively small molecules that can react with each other and/or with the electrode surface to form a comparatively robust and stable film. Structurally, film forming additives include monomer-type molecules that have unsaturated carbon bonds. The molecules can be linear or cyclic. Cyclic compounds can be heterocycles, have multiple rings, and include highly strained rings such as 3-, 4-, 5-, and 6-membered rings and spirocyclic structures). Particularly, heterocyclic film forming additives are highly reactive towards nucleophilic species or radical anions to form homogenous and protective films. Film forming additives include maleic anhydride (MA):

(d)

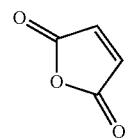

1,3-Propane Sultone (PS):

(e)

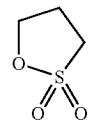

Gamma Butyrolactone (GBL):

(f)

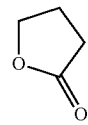

Maleic Imide (MI):

(g)

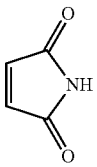

And Succinonitrile (SN):

(h)

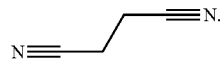

Certain lithium salt additives can help stabilize SEI through a variety of mechanism, including promoting ion diffusion through the SEI. Lithium salt additives included lithium tetrafluoroborate ($LiBF_4$), lithium difluoro(oxalato)borate (LiFOB), lithium bis(oxalato)borate (LiBOB), and lithium bis-trifluoromethanesulfonimide (LiTFSi).

Certain electrolyte formulations disclosed herein include an inorganic silicon-containing compound as one of the additives in the additive combination. Certain organic silicon-containing additives can reduce oxidative decomposition of conventional electrolytes by promoting SEI formation on the battery cathode. For example, US Patent Publication US20120315536, the entire content of which is incorporated by reference herein, discloses a variety of silicon containing organic additives that promoting SEI formation on the battery cathode. Certain organic silicon compounds are believed to form a protective layer at the cathode surface and the resulting SEI could mitigate oxidative decomposition of the electrolyte solvent.

The inorganic silicon containing additives disclosed herein can, in combination with certain other additives, substantially suppress gas generation in lithium ion cells. These silicon-containing additives alone were found to not substantially suppress gas generation in testing conducted as described below. Examples of inorganic silicon containing additives include $ZrSiO_4$, $Na_2SiO_3$, $BaSiO_4$, and $SrSiO_4$. A preferred embodiment of an inorganic silicon containing additive is $CaSiO_3$.

The combination of inorganic silicon containing additives and polymer additives achieved an unexpectedly high degree of gas suppression. As demonstrated herein, certain additive combinations suppressed gas generation in batteries in a number of challenging environments including high temperature storage of the battery in a fully charged state. Further, certain electrolyte formulations disclosed herein can suppress gas generation during high temperature storage of a battery held at 4.9 V without substantial negative effects on the initial reversible capacity of the battery. This result demonstrates unexpected synergy between the two types of additives and improves high voltage and high temperature stability in lithium ion batteries.

In certain embodiments of the invention, the additive is present at an amount that is significantly lower than the amount of electrolyte salt present in the electrolyte formulation of the electrochemical cell. The amount of additive can be expressed as a weight percent (wt %) of the total weight of the electrolyte formulation. In certain embodiments of the invention, the concentration of additive in the electronic formulation is less than or equal to about 5 weight percent, more preferably less than or equal to about 4 weight percent, more preferably less than or equal to about 3 weight percent, and still more preferably less than or equal to about 2 weight percent.

In certain embodiments of the invention, the concentration of each additive in the electronic formulation is equal to about 4.0 wt %, 3.9 wt %, 3.8 wt %, 3.7 wt %, 3.6 wt %, 3.5 wt %, 3.4 wt %, 3.3 wt %, 3.2 wt %, 3.1 wt %, 3.0 wt %, 2.9 wt %, 2.8 wt %, 2.7 wt %, 2.6 wt %, 2.5 wt %, 2.4 wt %, 2.3 wt %, 2.2 wt %, or 2.1 wt %, 2.0 wt %, 1.9 wt %, 1.8 wt %, 1.7 wt %, 1.6 wt %, 1.5 wt %, 1.4 wt %, 1.3 wt %, 1.2 wt %, 1.1 wt %, 1.0 wt %, 0.9 wt %, 0.8 wt %, 0.7 wt %, 0.6 wt %, 0.5 wt %, 0.4 wt %, 0.3 wt %, 0.2 wt %, or 0.1 wt %. In certain embodiments of the invention, the concentration of additive in the electrolyte formulation is in the range of about 2.0 wt % to about 0.5 wt %.

Advantageously, the electrolyte formulations including the combinations of additives disclosed herein can reduce, suppress, or inhibit gas generation over a wide range of operational temperatures, such as when batteries incorporating the electrolyte formulations including certain combinations of additives disclosed herein are charged, discharged, or cycled from about −40° C. to about 80° C., from about −40° C. to about 60° C., from about −40° C. to about 25° C., from about −40° C. to about 0° C., from about 0° C. to about 60° C., from about 0° C. to about 25° C., from about 25° C. to about 60° C., or other ranges encompassing temperatures greater than or below 25° C. The inventive electrolyte formulations also can provide these performance characteristics over a wide range of operational voltages between a rated cut-off voltage and a rated charge voltage, such as when the batteries are charged, discharged, or cycled between voltage ranges encompassing about 2 V to about 4.2 V, about 2 V to about 4.3 V, about 2 V to about 4.5 V, about 2 V to about 4.6 V, about 2 V to about 4.7 V, about 2 V to about 4.95 V, about 3 V to about 4.2 V, about 3 V to about 4.3 V, about 3 V to about 4.5 V, about 3 V to about 4.6 V, about 3 V to about 4.7 V, about 3 V to about 4.9 V, about 2 V to about 6 V, about 3 V to about 6 V, about 4.2 V to about 6 V, about 4.5 V to about 6 V, about 2 V to about 5.5 V, about 3 V to about 5.5 V, about 4.5 V to about 5.5 V, about 2 V to about 5 V, about 3 V to about 5 V, about 4.5 V to about 5 V, or about 5 V to about 6 V, as measured relative to a lithium metal anode. The batteries can be charged to the rated charge voltage while substantially retaining the performance characteristics specified above, such as in terms of coulombic efficiency, retention of specific capacity, retention of coulombic efficiency, and rate capability.

Thus, electrolyte formulations including certain combinations of the additives disclosed herein improve the cycle life in batteries with relatively high energy cathode and anode materials. Using electrolyte additives disclosed herein, improvement was demonstrated in full cells containing $LiNi_{0.5}Mn_{1.5}O_4$ (LMNO) cathodes and carbon based anodes, as shown in the specific example below.

The following examples describe specific aspects of some embodiments of the invention to illustrate and provide a description for those of ordinary skill in the art. The examples should not be construed as limiting the invention, as the examples merely provide specific methodology and testing useful in understanding and practicing some embodiments of the invention.

METHODS

Battery Cell Assembly.

Battery cells were formed in a high purity argon filled glove box (M-Braun, $O_2$ and humidity content <0.1 ppm). A $LiNi_{0.5}Mn_{1.5}O_4$ (LMNO) cathode material and a graphite anode electrode were used. Each battery cell includes the composite cathode film, a polypropylene separator, and composite anode film. Electrolyte components were formulated and added to the battery cell.

Electrolyte Formulations.

Electrolyte formulations include ethylene carbonate (EC) and ethyl methyl carbonate (EMC). Additives were formulated in EC/EMC (1:2 by volume) with 1M $LiPF_6$ at the stated weight percentages. All results are averages of three cells.

SEI Formation.

Solid-electrolyte interphase (SEI) is formed during a formation cycle. For the cells tested herein, the formation cycle was 16 hours open current voltage (OCV) hold, followed by a C/20 charge to 4.9 V with a constant voltage (CV) hold for 0.5 hour, and then a C/3 discharge to 3.0 V at 30 degrees C. This formation cycle was repeated three times to complete formation.

Gas Generation Testing.

Cells were heated to 50 degrees C. and charged to 4.9 V at 1 C with a CV hold for 180 hours. Gas generation was measured by use of a pressure transducer within the fixed volume cell. The measured change in pressure was converted to amount of gas generated (μmol) using the ideal gas law. The amount of gas was then converted to a rate by dividing by the time, and normalized to the area of the electrode. Thus, the final quantities are expressed as a rate of gas generation in units of μmol/hour/cm².

RESULTS

Electrolyte formulations containing the inventive additives and/or additive combinations in LMNO cells resulted in up to ten times less gas generation at long term, high temperature storage when stored in a fully charged state as compared to control electrolyte formulations. Further, the inventive additives and/or combination of additives did not have an appreciable negative effect of initial reversible capacity.

FIG. 1 illustrates the electrochemical performance of various electrolyte formulations, including some formulations made according to certain embodiments of the invention. FIG. 1 shows the capacity at the first cycle for several electrochemical cells, each containing a different electrolyte formulation. The data point shown for each electrolyte formulation is an average of the data collected from three batteries formed with the particular electrolyte formulation.

In FIG. 1, all electrolyte formulations contain a blend of organic solvents (EC:EMC 1:2 by volume) and a lithium salt (1 M $LiPF_6$). The base control electrolyte formulation was made without any additives and the battery containing this control electrolyte formulation had a first cycle discharge capacity of about 117 mAh/g. Other electrolyte formulations were made by adding 2% by weight of various film forming additives or lithium salt additives to the base control electrolyte formulation. The film forming additives included maleic anhydride (MA), 1,3-propane sultone (PS), gamma butyrolactone (GBL), maleic imide (MI), and succinonitrile (SN). The lithium salt additives included lithium tetrafluoroborate ($LiBF_4$), lithium difluoro(oxalato)borate (LiFOB), lithium bis(oxalato)borate (LiBOB), and lithium bis-trifluoromethanesulfonimide (LiTFSi). Finally, electrolyte formulations including polymer additives were made by adding 2% by weight of certain polymer additives to the base control electrolyte formulation. In FIG. 1, the polymer additives were poly[(N-vinyl pyrrolidone)-co-(vinyl acetate)] (Poly-A) and poly[1,6-bis(p-carboxyphenoxy)hexane] (Poly-B).

Again referring to FIG. 1, the majority of the electrolyte solutions including film forming additives demonstrated an average discharge capacity similar to the control electrolyte formulation. Two additives, 1,3-propane sultone and succinonitrile, resulted in a higher discharge capacity than the base control electrolyte formulation. Finally, two of the electrolyte formulations having polymer additives (poly[(N-vinyl pyrrolidone)-co-(vinyl acetate)] and poly[1,6-bis(p-carboxyphenoxy)hexane]) resulted in a higher discharge capacity than the base control electrolyte formulation (at concentration of 2%).

In sum, the electrolyte formulations prepared according to embodiments disclosed herein essentially similarly to the base control, with some additives resulting in slightly improved discharge capacity. One important result demonstrated by FIG. 1 is that no negative effect of initial discharge capacity was observed in any of the inventive electrolyte formulations as compared to the various control electrolyte formulations. In other words, to the extent any of these additives are able to suppress gas formation, they do not negatively impact first cycle discharge capacity in these battery types. Another important result is that the polymer additives show improved capacity relative to the control. In other words, these additives suppress gas formation and improve capacity.

Figure 2A:
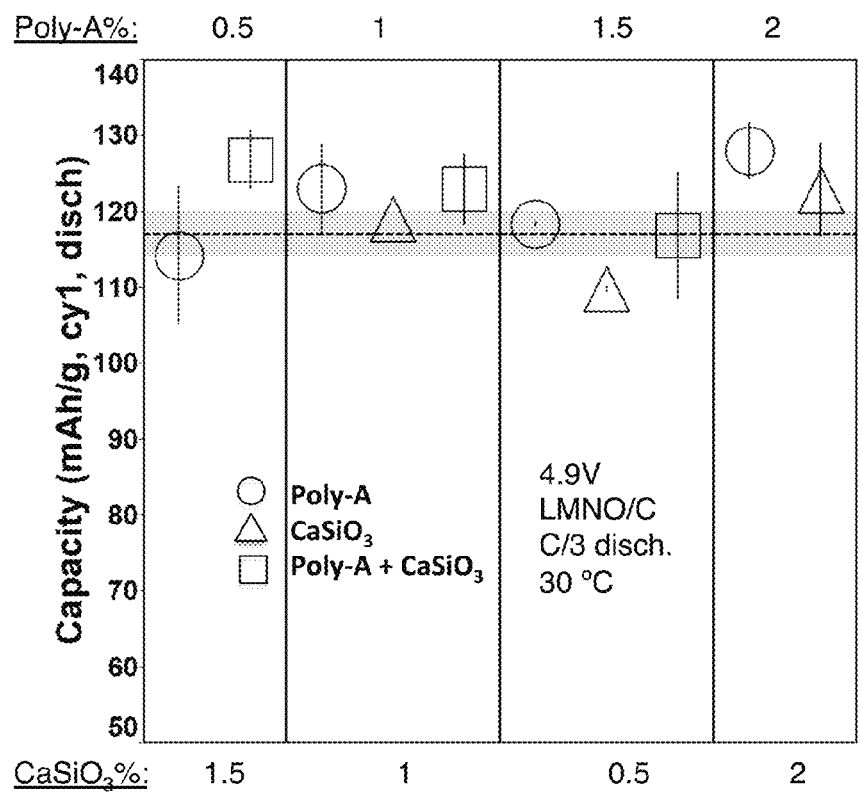
FIGS. 2A and 2B illustrate first cycle discharge capacity and first cycle coulombic efficiency, respectively, for several embodiments of inventive electrolyte formulations.
Figure 2B:
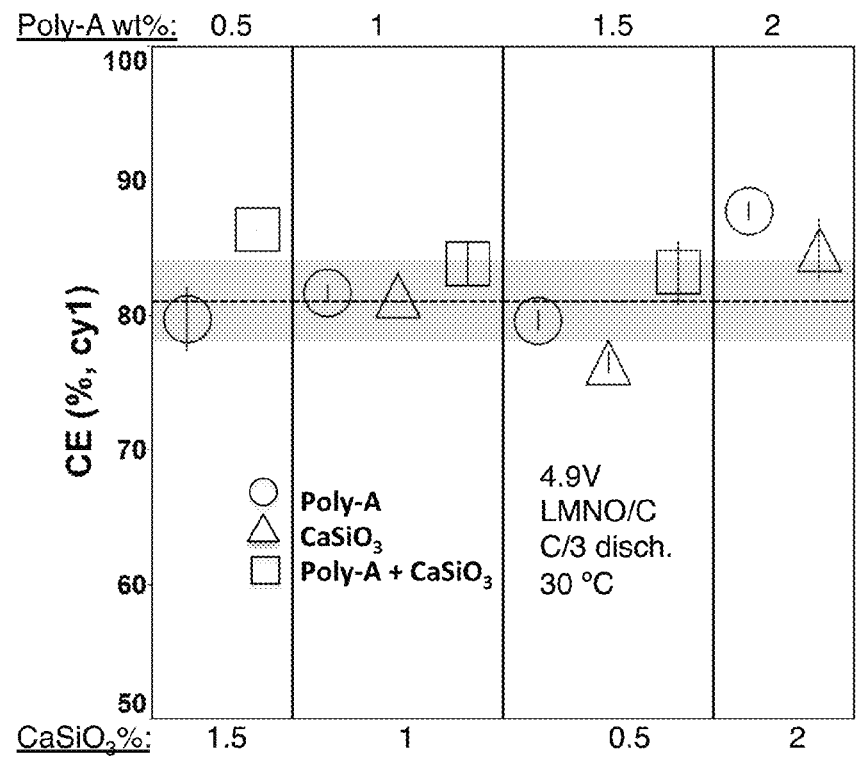

FIGS. 2A and 2B illustrate first cycle discharge capacity and first cycle coulombic efficiency, respectively, for several embodiments of inventive electrolyte formulations. FIG. 2A shows the mean discharge capacity for a battery formed using the base control electrolyte as a dotted line at about 117 mAh/g. FIG. 2A is divided into 4 columns, with each column corresponding to a weight percentage of poly[(N-vinyl pyrrolidone)-co-(vinyl acetate)] (Poly-A) and a weight percentage of calcium silicate ($CaSiO_3$).

Referring to FIG. 2A in the far left column, one electrolyte formulation included only 0.5 weight percent of (poly[(N-vinyl pyrrolidone)-co-(vinyl acetate)] as the additive. Also in the far left column is an electrolyte formulation including both 0.5 weight percent of (poly[(N-vinyl pyrrolidone)-co-(vinyl acetate)] and 1.5 weight percent of calcium silicate as the additive. In the middle left column, there is an electrolyte formulation including only 1.0 weight percent of poly[(N-vinyl pyrrolidone)-co-(vinyl acetate)] as the additive. In that same middle left column is an electrolyte formulation including only 1.0 weight percent of calcium silicate as the additive. Also in that middle left column is an electrolyte formulation including both 1.0 weight percent of poly[(N-vinyl pyrrolidone)-co-(vinyl acetate)] and 1.0 weight percent of calcium silicate as the additives.

Referring to FIG. 2A in the middle right column, there is an electrolyte formulation including only 1.5 weight percent of poly[(N-vinyl pyrrolidone)-co-(vinyl acetate)] as the additive. In that same middle right column is an electrolyte formulation including only 0.5 weight percent of calcium silicate as the additive. Also in that middle right column is an electrolyte formulation including both 1.5 weight percent of poly[(N-vinyl pyrrolidone)-co-(vinyl acetate)] and 0.5 weight percent of calcium silicate as the additives. In the far right column, one electrolyte formulation included only 2.0 weight percent of (poly[(N-vinyl pyrrolidone)-co-(vinyl acetate)] as the additive. Also in the far right column is an electrolyte formulation including only 2.0 weight percent of calcium silicate as the additive.

FIG. 2A demonstrates that while some of the electrolyte formulations including certain additives and/or additive combinations showed some improvement in discharge capacity, there is not a systematic relationship between concentration and performance. The most important result is that the additives have a moderate effect on the first cycle discharge capacity of the lithium ion battery in which they are included, as compared to a lithium ion battery having a control electrolyte formulation.

FIG. 2B illustrates the same sets of electrolyte formulations as presented in FIG. 2A, as well as the control electrolyte formulation, in a test of first cycle coulombic efficiency. The coulombic efficiency of the control electrolyte was about 81% and is represented by the dotted line. As with FIG. 2A, FIG. 2B demonstrates that while some of the electrolyte formulations including certain additives showed some improvement in coulombic efficiency, there is not a systematic relationship between concentration and performance. The most important result is that the additives have a moderate effect=on the first cycle coulombic efficiency of the lithium ion battery in which they are included, as compared to a lithium ion battery having a control electrolyte formulation.

Thus, FIGS. 2A and 2B extend the findings of FIG. 1 in that certain combinations of additives, namely a polymeric additive combined with an inorganic silicon additive, they do not negatively impact certain important electrochemical performance characteristics in these battery types.

Figure 3:
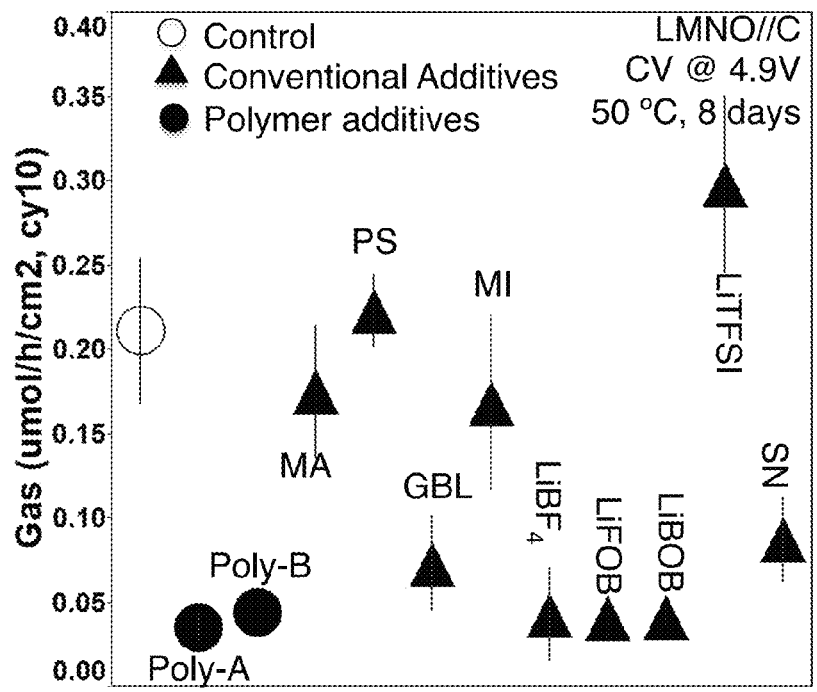
FIG. 3 illustrates the results of gas generation testing of the various electrolyte formulations from FIG. 1.

FIG. 3 illustrates the results of gas generation testing of the various electrolyte formulations from FIG. 1. The base control formulation, which did not contain any type of additive, generated from between about 0.17 µmol/hour/$cm^2$ of gas to about 0.26 µmol/hour/$cm^2$. The majority of the electrolyte formulations including film forming additives performed comparably to the base control electrolyte formulation, with gamma butyrolactone and succinonitrile providing a reduction in gas generation. Three of the lithium salt additives suppressed gas generation, with only lithium bis-trifluoromethanesulfonimide not providing an improvement. Finally, both of the polymer additives demonstrated the ability to significantly suppress gas generation in a lithium ion battery, (poly[(N-vinyl pyrrolidone)-co-(vinyl acetate)]) and poly[1,6-bis(p-carboxyphenoxy)hexane] additives both providing improvements.

Figure 4A:
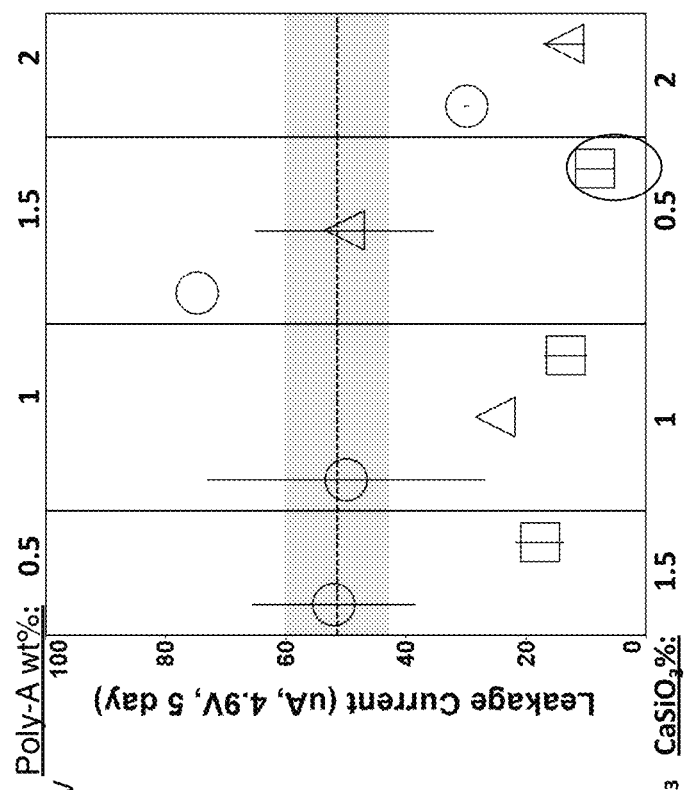
FIGS. 4A and 4B illustrate the results of characterization of gas generation and electrical performance for the same series of battery and electrolyte configurations illustrated in FIGS. 2A and 2B.
Figure 4B:
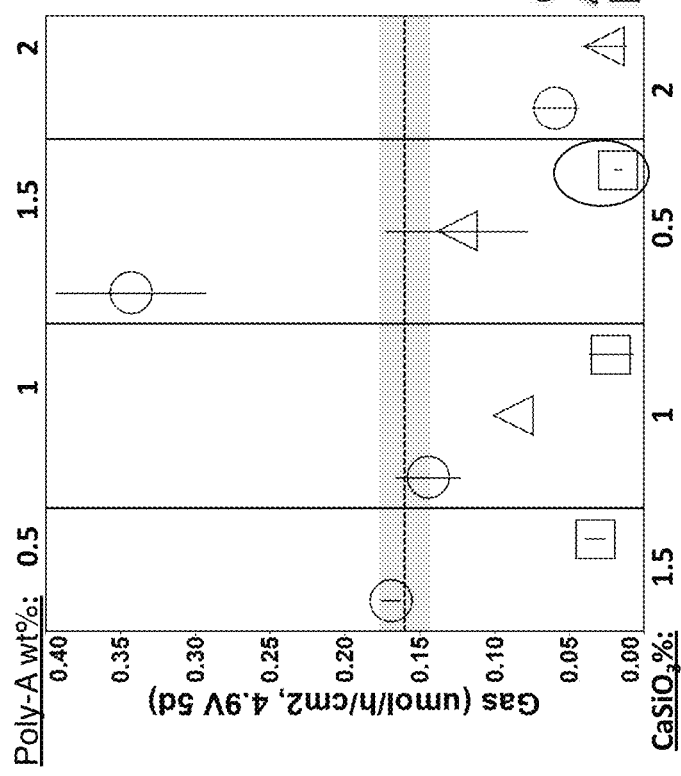

FIGS. 4A and 4B illustrate the results of characterization of gas generation and electrical performance for the same series of battery and electrolyte configurations illustrated in FIGS. 2A and 2B. FIG. 4A illustrates the results of gas generation testing over 5 days in batteries with the various additive configurations in the electrolyte formulation. The gas generation in the battery having a control electrolyte is represented by the dotted line. The electrolyte formulations including the polymer additive (poly[(N-vinyl pyrrolidone)-co-(vinyl acetate)]) exhibited no improvement in gas generation for the two lowest concentrations amounts. At 2 weight percent additive, the electrolyte formulation including the polymer additive (poly[(N-vinyl pyrrolidone)-co-(vinyl acetate)]) showed some reduction in gas generation. The various concentrations of calcium silicate exhibited a generally concentration dependent trend towards increased gas suppression.

Referring still to FIG. 4A, the greatest improvement in suppression of gas generation occurred in batteries using an electrolyte formulation including both types of additives disclose herein as being effective for gas suppression: polymeric and inorganic silicon. In particular, the electrolyte formulation including 1.5 weight percent poly[(N-vinyl pyrrolidone)-co-(vinyl acetate)] and 0.5 weight percent calcium silicate reduced the gas generation more than any other formulation. The result demonstrates an unexpected synergy between the poly[(N-vinyl pyrrolidone)-co-(vinyl acetate)] and the calcium silicate. That it, it is unexpected based on the individual contributions to gas suppression that the combination of poly[(N-vinyl pyrrolidone)-co-(vinyl acetate)] and calcium silicate would generate such an improvement. Indeed, the electrolyte formulation including 1.5 weight percent poly[(N-vinyl pyrrolidone)-co-(vinyl acetate)] demonstrated an increase in gas generation.

The electrolyte formulations including a combination of poly[(N-vinyl pyrrolidone)-co-(vinyl acetate)] and calcium silicate demonstrated a trend in improvement such that the combination of 1.5 weight percent poly[(N-vinyl pyrrolidone)-co-(vinyl acetate)] and 0.5 weight percent $CaSiO_3$ performed better than the combination of 1 weight percent poly[(N-vinyl pyrrolidone)-co-(vinyl acetate)] and 1 weight percent $CaSiO_3$, which in turn performed better than the combination of 0.5 weight percent poly[(N-vinyl pyrrolidone)-co-(vinyl acetate)] and 1.5 weight percent $CaSiO_3$.

FIG. 4B illustrates testing of the leakage current for batteries including the electrolyte formulations presented in FIG. 4B. Generally speaking, the relative values for the leakage current data mirrors that of the gas generation data. Leakage current testing is a measure of parasitic reactions, and a comparatively lower level of leakage current is an indicator that unwanted reactions are not occurring or occurring less than in a control battery.

Figure 5:
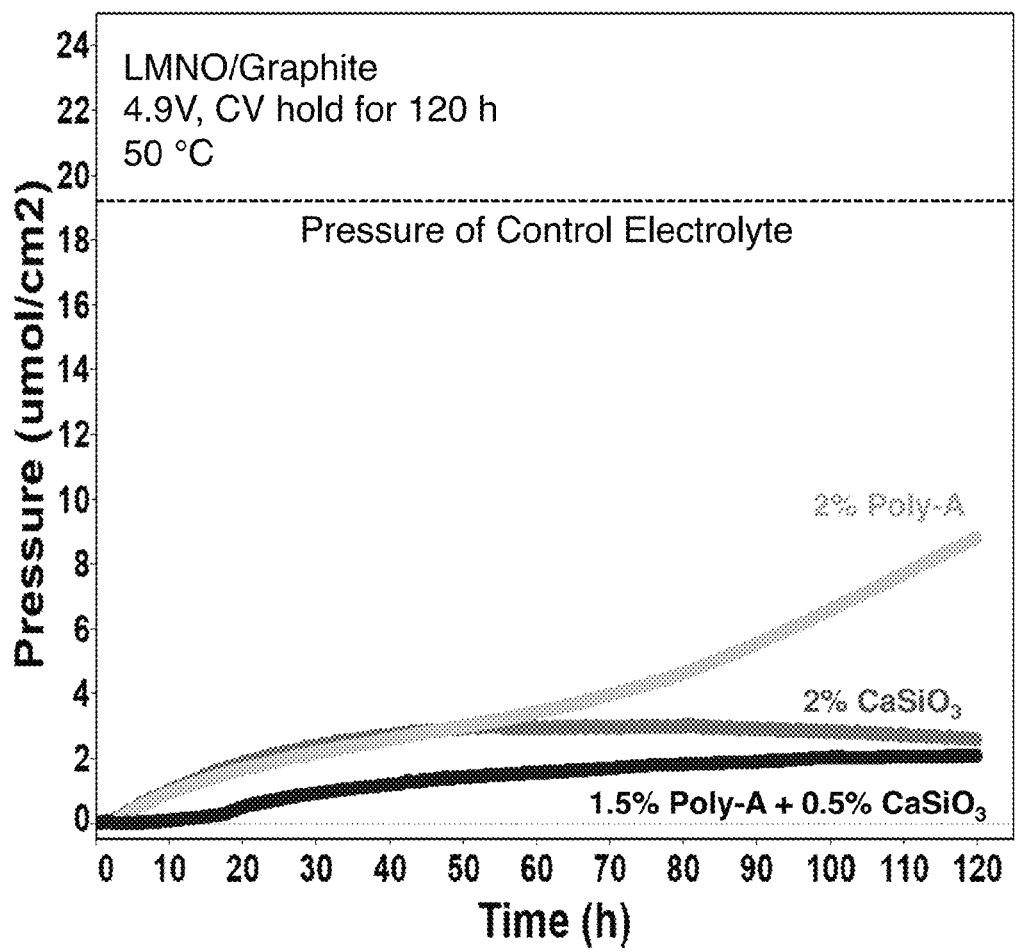
FIG. 5 illustrates the time-dependence of the gas evolution in battery cells formed with certain electrolyte formulations.

FIG. 5 illustrates the time-dependence of the gas evolution in battery cells formed with certain electrolyte formulations. FIG. 5 compares an electrolyte formulation including only a polymer additive, an electrolyte formulation including only an inorganic silicon containing additive, and an electrolyte formulation that includes both the polymer additive and the inorganic silicon containing additive. This embodiment of the inventive electrolyte formulation diverges from the gas evolution traces of both of the single-additive electrolyte formulation. All three of the electrolyte formulations including additives are far below the value of the control electrolyte, represented by the dotted line. In this testing, the temperature was kept constant at 50 degrees C.

The specific embodiments tested herein, and embodiments of the combination electrolyte formulations that share the inventive features disclosed herein, can significantly reduce the amount of gas generated in a lithium ion electrochemical cell tested at high temperature and/or at high voltages. In certain embodiments, polymer additives alone significantly reduce the amount of gas generated in a lithium ion electrochemical cell tested at high temperature and/or at high voltages. In certain embodiments, polymer additives in combination with film forming additives can reduce the amount of gas generated in a lithium ion electrochemical cell tested at high temperature and/or at high voltages. And, the combination of an inorganic silicon containing additive and a polymer additive in a conventional electrolyte solution dramatically improves the gas generation performance of that conventional electrolyte without altering the first cycle discharge capacity. It is particularly unexpected because, individually, each of these additive types does not significantly reduce gas generation in a lithium ion battery stored at high temperature.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

The invention claimed is:

1. A battery comprising:
    an anode;
    a cathode; and
    a liquid electrolyte comprising a polymer additive in solution with an electrolyte solvent and a solid-electrolyte interface promoting additive, wherein the polymer additive comprises one or more of poly[(N-vinyl pyrrolidone)-co-(vinyl acetate)] and poly[1,6-bis(p-carboxyphenoxy)hexane].

2. The battery of claim 1 wherein the solid-electrolyte interface promoting additive comprises an inorganic silicon containing additive in solution with an electrolyte solvent.

3. The battery of claim 2, wherein the inorganic silicon containing additive comprises calcium metasilicate.

4. The battery of claim 1, wherein the polymer additive comprises poly[(N-vinyl pyrrolidone)-co-(vinyl acetate)].

5. The battery of claim 3, wherein the polymer additive comprises poly[(N-vinyl pyrrolidone)-co-(vinyl acetate)].

6. The battery of claim 1, wherein the polymer additive comprises poly[1,6-bis(p-carboxyphenoxy)hexane].

7. The battery of claim 1 wherein the solid-electrolyte interface promoting additive comprises a film forming additive.

8. The battery of claim 7, wherein the film forming additive is selected from the group consisting of gamma butyrolactone and succinonitrile.

9. The battery of claim 1 further comprising a lithium salt additive.

10. The battery of claim 9, wherein the lithium salt additive is selected from the group consisting of lithium tetrafluoroborate ($LiBF_4$), lithium difluoro(oxalato)borate (LiFOB), and lithium bis(oxalato)borate (LiBOB.

11. The battery of claim 1, wherein the cathode comprises $LiNi_{0.5}Mn_{1.5}O_4$.

12. A method of making a battery, comprising:
assembling an anode, a cathode, and a liquid electrolyte, wherein the liquid electrolyte comprises a solid-electrolyte interface promoting additive and a polymer additive in solution with an electrolyte solvent.

13. The method of claim 12, wherein the solid-electrolyte interface promoting additive comprises an inorganic silicon containing additive in solution with an electrolyte solvent.

14. The method of claim 13 wherein the inorganic silicon containing additive comprises calcium metasilicate.

15. The method of claim 12, wherein the polymer additive comprises one or more of poly[(N-vinyl pyrrolidone)-co-(vinyl acetate)] and poly[1,6-bis(p-carboxyphenoxy)hexane].

16. The method of claim 14 wherein the polymer additive comprises poly[(N-vinyl pyrrolidone)-co-(vinyl acetate)].

17. The method of claim 12, wherein the cathode comprises $LiNi_{0.5}Mn_{1.5}O_4$.

18. The method of claim 12, wherein the solid-electrolyte interface promoting additive comprises a film forming additive.

19. The method of claim 18, wherein the film forming additive is selected from the group consisting of gamma butyrolactone and succinonitrile.

20. The method of claim 16, wherein the solid-electrolyte interface promoting additive comprises a lithium salt additive.

21. The method of claim 20, wherein the lithium salt additive is selected from the group consisting of lithium tetrafluoroborate ($LiBF_4$), lithium difluoro(oxalato)borate (LiFOB), and lithium bis(oxalato)borate (LiBOB.

* * * * *